Patented Aug. 12, 1924.

1,504,624

UNITED STATES PATENT OFFICE.

JOSEF JANNEK, OF LUDWIGSHAFEN-ON-THE-RHINE, GERMANY, ASSIGNOR TO BADISCHE ANILIN- & SODA-FABRIK, OF LUDWIGSHAFEN-ON-THE-RHINE, GERMANY, A CORPORATION OF GERMANY.

PURIFYING GAS.

No Drawing.   Application filed August 19, 1921. Serial No. 493,749.

*To all whom it may concern:*

Be it known that I, JOSEF JANNEK, citizen of Germany, residing at Ludwigshafen-on-the-Rhine, Germany, have invented new and useful Improvements in Purifying Gases, of which the following is a specification.

The present invention relates to a process of purifying gases and more especially to a process of removing carbon oxysulfid from gases which are substantially free from inorganic sulfur compounds such as hydrogen sulfid. I have discovered that carbon oxysulfid (COS) which otherwise can be but difficultly absorbed from gases containing it, is readily absorbed if the gases are passed over active charcoal having an alkaline condition. In order to maintain the activity of the contact mass, the carbon oxysulfid must be decomposed by the action of oxygen and we prefer to introduce the oxygen together with the gases to be purified. Activated wood charcoal may be employed, or charcoal precipitated on fireproof carriers by the decomposition of suitable substances. The alkaline reaction is preferably obtained by introducing ammonia or applying ammonium salt of a weak acid in the presence of water or of water vapor which forms a layer of moisture on the surface of the charcoal. The process is of great importance for the withdrawal of small quantities of carbon oxysulfid from gases which have already been purified in any suitable way from other impurities particularly sulfuretted hydrogen, for example in connection with the catalytic production of ammonia.

As an example, hydrogen containing in each cubic meter about 1 milligram, or less, of sulfur in the form of carbon oxysulfid and similar compounds, but freed from other impurities, is passed through a layer of granulated wood charcoal, prepared by charring wood with suitable metal chlorids capable of splitting off hydrogen chlorid as for example active charcoal prepared according to the specification of British Letters Patent No. 10126/1914. Small quantities of air are added to the gas before it reaches the contact layer as well as small quantities of ammonia, for example by causing the gas to pass through a dilute aqueous solution of ammonia so that the mixture contains about 3 volumes of ammonia and 1 volume of oxygen to each one volume of carbon oxysulfid.

Even if a rapid gas current be employed, the gas leaving the catalyst will be practically free from sulfur, the carbon oxysulfid being absorbed either entirely or down to a minimum amount and oxidized to sulfur or to ammonium sulfate or the like. The ammonia may be introduced in any other form or manner desired, for example by adding drop by drop an aqueous solution of ammonia or by admixing gaseous ammonia and so on. The process may also be varied in other respects as desired; it may be carried out at ordinary or at raised pressure. The gas to be purified often already contains a sufficient quantity of oxygen in which case only the addition of alkali or of ammonia will be necessary.

I claim:—

1. The process of removing carbon oxysulfid from gases which consists in treating a gas which has been purified from hydrogen sulfid, with an active charcoal having an alkaline condition.

2. The process of removing carbon oxysulfid from gases which consists in treating a gas which has been purified from hydrogen sulfid, with an active charcoal having an alkaline condition and in the presence of a small amount of oxygen sufficient to cause oxidation of the carbon oxysulfid.

3. The process of removing carbon oxysulfid from gases which consists in subjecting a gas which previously has been purified from hydrogen sulfid to the action of active charcoal in the presence of the required quantity of oxygen and in the presence of ammonia.

In testimony whereof I have hereunto set my hand,

JOSEF JANNEK.